United States Patent
Kuo et al.

(10) Patent No.: US 9,942,463 B2
(45) Date of Patent: Apr. 10, 2018

(54) CAMERA DEVICE WITHOUT IMAGE DISPLAYING FUNCTION

(71) Applicant: PixArt Imaging Inc., Hsin-Chu (TW)

(72) Inventors: Shih-Wei Kuo, Hsin-Chu (TW); Feng-Cheng Yang, Hsin-Chu (TW); Yi-Min Liu, Hsin-Chu (TW); Yen-Min Chang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 61 days.

(21) Appl. No.: 14/275,891

(22) Filed: May 13, 2014

(65) Prior Publication Data

US 2015/0189162 A1 Jul. 2, 2015

(30) Foreign Application Priority Data

Jan. 2, 2014 (TW) .............................. 103100087 A

(51) Int. Cl.
  *H04N 5/222* (2006.01)
  *H04N 5/225* (2006.01)
  *H04N 5/232* (2006.01)

(52) U.S. Cl.
  CPC ....... *H04N 5/23216* (2013.01); *H04N 5/2253* (2013.01); *H04N 5/2254* (2013.01); *H04N 5/23203* (2013.01); *H04N 5/23293* (2013.01)

(58) Field of Classification Search
  CPC ........... H04N 5/23293; H04N 5/23216; H04N 5/2252; H04N 5/2257; H04N 5/2254
  See application file for complete search history.

(56) References Cited

U.S. PATENT DOCUMENTS

| | | | | |
|---|---|---|---|---|
| 2007/0268371 A1* | 11/2007 | Misawa | ............. | H04N 5/23203 348/207.99 |
| 2010/0033587 A1* | 2/2010 | Yumiki | .................. | G02B 7/102 348/220.1 |
| 2012/0009896 A1* | 1/2012 | Bandyopadhyay | ... | G06F 1/1643 455/411 |
| 2012/0229661 A1* | 9/2012 | Sekiguchi | ............. | A61B 5/0205 348/208.4 |
| 2013/0064533 A1* | 3/2013 | Nakata | ............................ | 396/76 |
| 2013/0141640 A1* | 6/2013 | Kim | ...................... | H04N 5/2254 348/375 |
| 2013/0336546 A1* | 12/2013 | Pritikin | .............. | G06K 9/00892 382/116 |

* cited by examiner

*Primary Examiner* — Daniel M Pasiewicz
*Assistant Examiner* — Selam Gebriel
(74) *Attorney, Agent, or Firm* — Winston Hsu

(57) ABSTRACT

A camera device without an image displaying function which is adapted to assemble with a portable electronic device with a vision displaying module is disclosed in the present invention. The camera device is electrically connected to the portable electronic device via wire/wireless connection. The camera device includes a base, a lens module and at least one touch navigation module. The base includes a surrounding component whereinside the lens module is disposed. The lens module includes a lens assembly and a digital processing unit. The touch navigation module is disposed on an outer surface of the surrounding component and electrically connected to the lens module. The touch navigation module detects an input command to trigger the lens assembly to capture an image, or controls parameters of an adjustable mode of the lens assembly via the digital processing unit.

13 Claims, 5 Drawing Sheets

CAMERA DEVICE WITHOUT IMAGE DISPLAYING FUNCTION

BACKGROUND OF THE INVENTION

1. Field of the Invention

The present invention relates to a camera device, and more particularly, to a camera device without an image displaying function and capable of utilizing a touch navigation module to vary a parameter of an adjustable mode.

2. Description of the Prior Art

A conventional camera controlling technique communicates a plurality of cameras by wire connection or wireless connection, and a user utilizes a control panel of one of the cameras to remotely control another camera. Each camera has a lens module and a display panel, and is able to capture an image independently. The user can input a control command by the master camera, and the control command drives the slave camera to actuate a shutter via the wire connection or the wireless connection. Each camera can be set as the master camera or the slave camera alternatively. However, the image captured by the slave camera is displayed on the display panel of the slave camera, and the user inputs the control command by the master camera for the remote control. Hands of the user have to respectively hold one camera, and it is difficult to simultaneously give consideration to complicated buttons of the master camera and the slave camera by single hand operation. Manipulation of the conventional camera controlling technique is inconvenient.

Another conventional camera controlling technique utilizes a wireless controller to send out the control command to the camera. The camera with the foresaid controlling technique has the lens module and the display panel. The wireless controller is a combination of a button, a circuit board and a signal transmitter. The wireless controller cannot capture the image and does not provide an image displaying function. The image capturing function and the image displaying function are owned by the camera, the wireless controller only has an output function of sending out the control command. Position of the user is usually distant from the camera when operating the wireless controller, so the user cannot watch the display panel of the camera to confirm quality of the image.

SUMMARY OF THE INVENTION

The present invention provides a camera device without an image displaying function and utilizing a touch navigation module to vary a parameter of an adjustable mode for solving above drawbacks.

According to the claimed invention, a camera device without an image displaying function is disclosed. The camera device is adapted to assemble with a portable electronic device with a vision displaying module. The camera device is electrically connected to the portable electronic device via wire connection or wireless connection. The vision displaying module is adapted to display a parameter and an adjusted effect of the camera device when the camera device is electrically connected to the portable electronic device. The camera device includes a base, a lens module and at least one touch navigation module. The base includes a surrounding component. The lens module is disposed inside the surrounding component. The lens module includes a lens assembly and a digital processing unit. The touch navigation module is disposed on an outer surface of the surrounding component and electrically connected to the lens module. The touch navigation module detects an input command to trigger the lens assembly to capture an image, or varies the parameter of an adjustable mode of the lens assembly via the digital processing unit.

According to the claimed invention, the base further includes an engaging component disposed on the surrounding component. The surrounding component is detachably assembled with the portable electronic device by the engaging component.

According to the claimed invention, the touch navigation module triggers the lens assembly or switches the adjustable mode of the lens assembly according to a click amount of the input command. The touch navigation module further varies the parameter of the lens assembly according to a shift direction of the input command.

According to the claimed invention, the touch navigation module further detects a biometric characteristic. The digital processing unit automatically sets the parameter of the lens assembly according to the biometric characteristic. The digital processing unit determines whether the lens assembly is actuated according to the biometric characteristic.

According to the claimed invention, the touch navigation module is an optical finger navigation module, a capacitance detecting navigation module, or a radio frequency detecting navigation module.

The touch navigation module of the present invention can replace the conventional mechanic button and the conventional rotary ring, so as to simplify structural configuration of the camera device for an appearance trend of modularity and thin design. The touch navigation module utilizes optical detection, capacitance detection or radio frequency detection to detect the click amount and the shift direction of the input command, to avoid a drawback that sensitivity and accuracy of the conventional mechanic button are decreased by long-term use. Besides, the touch navigation module of the present invention reads the input command and the adjusting ring by the optical detecting technique, which has advantages of low attrition rate and great reliability of the camera device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
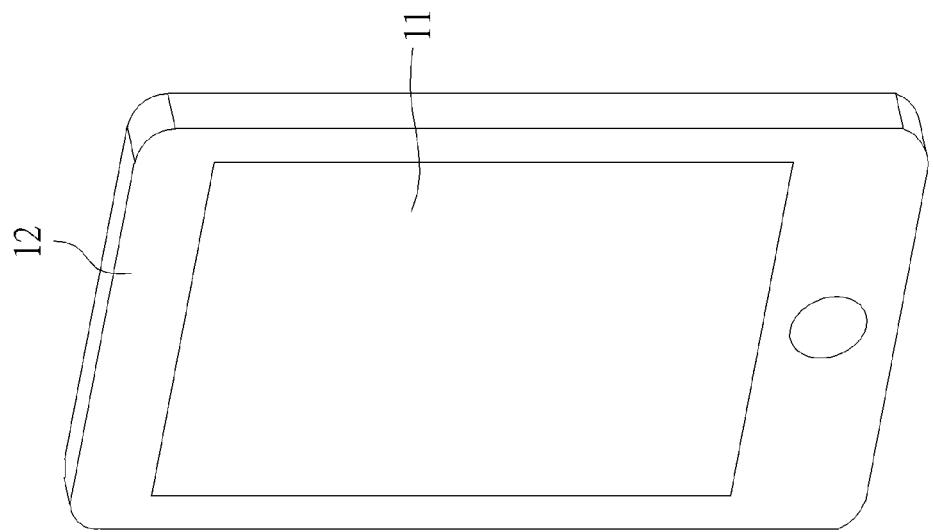
FIG. 1 is a diagram of a camera device according to a first embodiment of the present invention.
Figure 1:
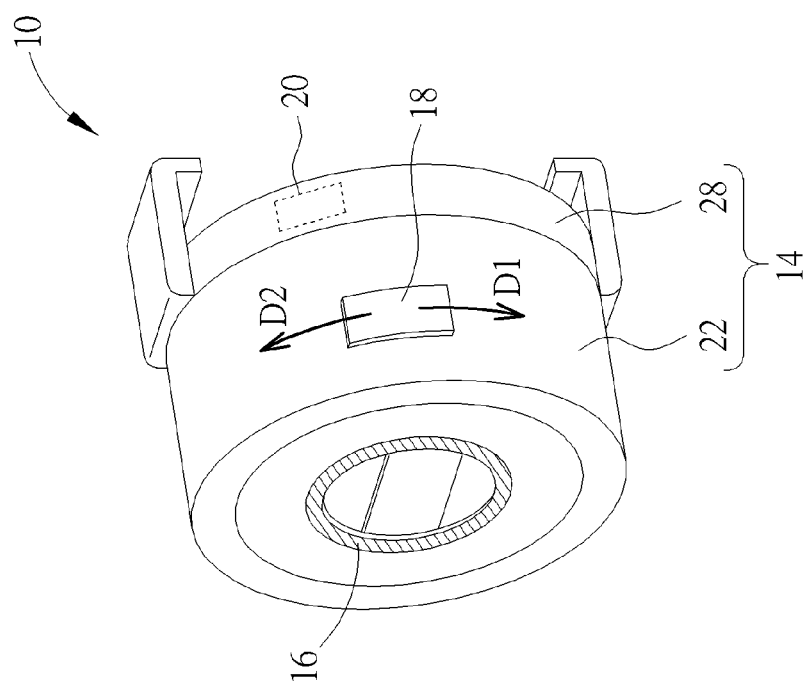
Figure 2:
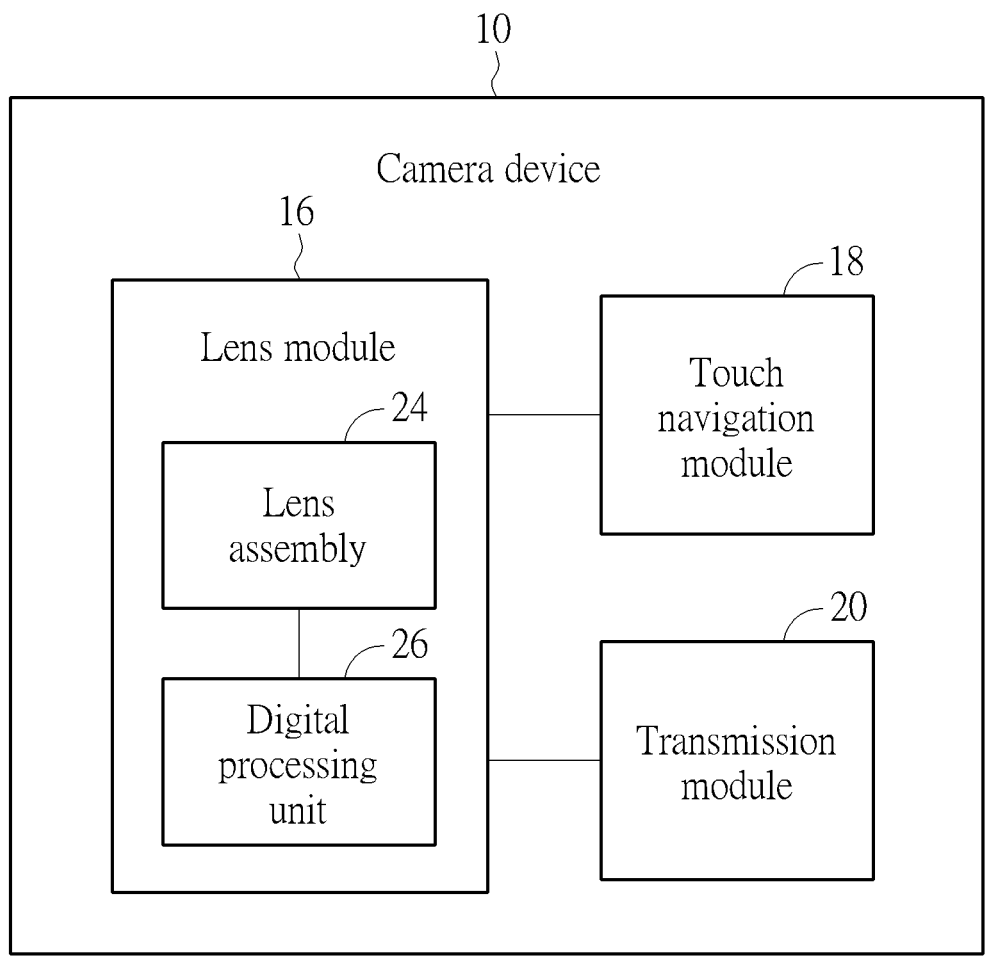
FIG. 2 is a functional block diagram of the camera device according to the first embodiment of the present invention.

Please refer to FIG. 1 and FIG. 2. FIG. 1 is a diagram of a camera device 10 according to a first embodiment of the present invention. FIG. 2 is a functional block diagram of the camera device 10 according to the first embodiment of the present invention. The camera device 10 does not have an image displaying function, and is able to assemble with a portable electronic device 12 with a vision displaying module 11. The vision displaying module 11 can be a screen panel, a screen with a projecting function, or a projector capable of projecting an image directly onto an eye. The camera device 10 is electrically connected to the portable electronic device 12 via wire connection or wireless connection, so as to utilize the vision displaying module 11 to show an image captured by the camera device 10. As the camera device 10 is electrically connected to the portable electronic device 12, the vision displaying module 11 further can show a parameter and an adjusted effect of the camera device 10.

The camera device 10 includes a base 14, a lens module 16, at least one touch navigation module 18 and a transmission module 20. The lens module 16 is disposed inside a surrounding component 22 of the base 14. The lens module 16 captures the image and executes digital processing procedure for the image. The touch navigation module 18 detects motion of user's finger, so that a mechanical rotary ring of the conventional camera can be replaced by the touch navigation module 18. The touch navigation module 18 is disposed on an outer surface of the surrounding component 22 and electrically connected to the lens module 16, which conforms to a normal operation habit of the camera lens. As shown in FIG. 2, the lens module 16 includes a lens assembly 24 and a digital processing unit 26. The lens assembly 24 can have a plurality of optical components, such as a lens, a shutter, an aperture, a focus screen and so on. The lens assembly 24 is utilized to capture the image. The digital processing unit 26 is electrically connected to the lens assembly 24, and adapted to adjust the parameter of the lens assembly 24 according to an input command detected by the touch navigation module 18. The touch navigation module 18 analyzes a property of the input command to determine whether the lens assembly 24 is actuated to capture the image (such as triggering the shutter), or to vary the parameter of an adjustable mode of the lens assembly 24.

Because the lens assembly 24 includes the plurality of optical components, the lens assembly 24 accordingly includes a plurality of adjustable modes, which includes a shutter speed adjusting mode, an aperture adjusting mode, a focal length adjusting mode, an exposure value adjusting mode, and a photosensitivity adjusting mode. Application of the adjustable mode is not limited to the above-mentioned embodiment, and depends on design demand. As the input command represents a click command, the touch navigation module 18 can trigger the shutter of the lens assembly 24 to capture the image. As the input command represents a shift command, the touch navigation module 18 can vary the parameter of one of the adjustable modes of the lens assembly 24. For example, when the lens assembly 24 is switched to the aperture adjusting mode, the input command which moves at a first direction D1 drives reduction of the aperture, and the input command which moves at a second direction D2 drives enlargement of the aperture. When lens assembly 24 is switched to the photosensitivity adjusting mode, the input command which moves at the first direction D1 drives increase of the photosensitivity, and the input command which moves at the second direction D2 drives decrease of the photosensitivity.

The touch navigation module 18 can switch the adjustable modes of the lens assembly 24 according to a click amount of the input command, so as to adjust the corresponding optical component. For example, when the click amount of the input command within a specific period equals one, the touch navigation module 18 triggers the lens assembly 24 to capture the image. When the click amount of the input command within the specific period equals two (the amount is set according to actual demand), the touch navigation module 18 switches the plurality of adjustable modes of the lens assembly 24 in sequence to select the intended adjustable mode, and the parameter of the selected adjustable mode of the lens assembly 24 can be varied according to a shift direction of the input command.

The transmission module 20 can be the WiFi communication module, the near field communication module, the radio frequency communication module and so on. Position of the transmission module 20 is not limited to the first embodiment, and depends on design demand. The portable electronic device 12 further includes a transceiver relative to the transmission module 20. The camera device 10 does not have the image displaying function, the image captured by the lens assembly 16 is transmitted to the transceiver via the transmission module 20, and displayed on the vision displaying module 11 of the portable electronic device 12. Besides, the user can input a command of taking a picture, a command of switching the adjustable mode or a command of varying the parameter by the portable electronic device 12 since the portable electronic device 12 includes a camera application program. The said command is transmitted to the transmission module 20 via the transceiver, so as to remotely control the camera device 10 to trigger the lens assembly 24 for capturing the image, to vary the parameter of the lens assembly 24, or to switch the adjustable mode of the lens assembly 24.

As shown in FIG. 1, the base 12 further can include an engaging component 28 disposed on the surrounding component 22. The camera device 10 is detachably assembled with the portable electronic device 12 by the engaging component 28, so the surrounding component 22 and the lens assembly 16 can be conveniently connected to the portable electronic device 12. The camera device 10 and the portable electronic device 12 are assembled to form a monocular camera for preferred operation feel. The engaging component 28 is a selective unit because a capture view of the foresaid assembly may be limited. As the camera device 10 is separated from the portable electronic device 12, the camera device 10 can be arbitrarily moved and the related capture view is unlimited. The engaging component 28 is made of resilient deformable material. An external force is applied to the engaging component 28 to generate structural deformation, and the engaging component 28 can be rapidly engaged with the portable electronic device 12. Thus, assembly/disassembly of the camera device 10 and the portable electronic device 12 are effectively simplified due to the engaging component 28.

Figure 3:
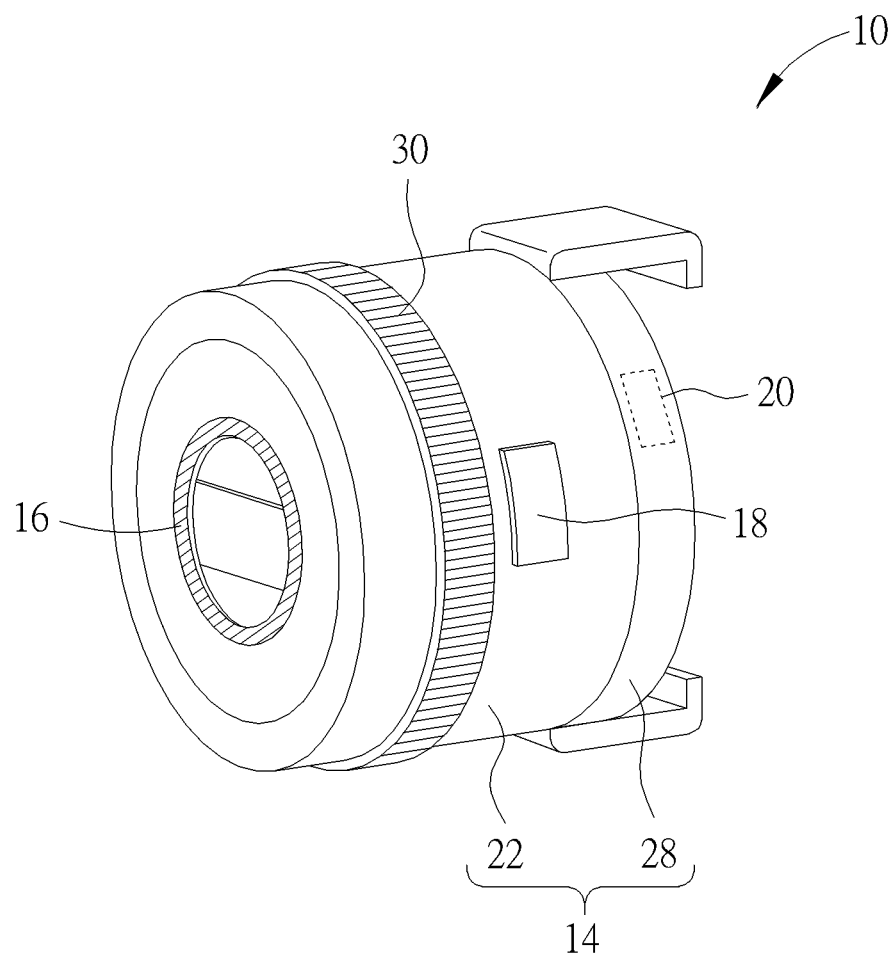
FIG. 3 is a diagram of the camera device according to a second embodiment of the present invention.
Figure 4:
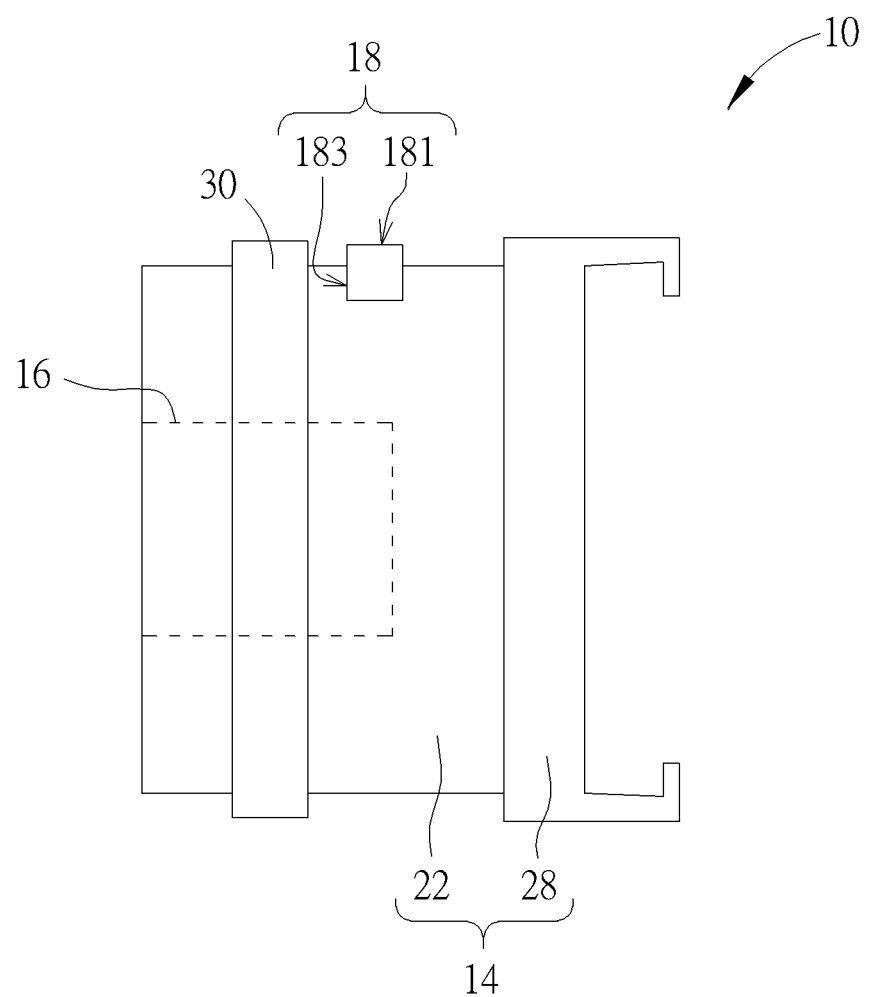
FIG. 4 is a lateral view of the camera device according to the second embodiment of the present invention.

Please refer to FIG. 3 and FIG. 4. FIG. 3 is a diagram of the camera device 10 according to a second embodiment of the present invention. FIG. 4 is a lateral view of the camera device 10 according to the second embodiment of the present invention. The camera device 10 further can include an adjusting ring 30 connected to the lens assembly 16 and rotatably disposed outside the surrounding component 22. The adjusting ring 30 is rotated to vary the parameter of the lens assembly 16, such as the focal length or the shutter, which means the adjusting ring 30 can be a zoom ring or a variable aperture. Application of the adjusting ring 30 is not limited to the above-mentioned embodiment. The adjusting ring 30 and the touch navigation module 18 are parameter adjusting interfaces of the camera device 10. The touch navigation module 18 not only detects the input command generated by the user, but also detects the rotation of the adjusting ring 30. The touch navigation module 18 detects rotation of the adjusting ring 30 by non-contact detecting technique (such as an optical detecting technique), to effectively prevent the mechanic structure from damage by friction.

As shown in FIG. 4, the touch navigation module 18 includes a first detecting portion 181 and a second detecting portion 183. A partial structure of the touch navigation module 18 protrudes from the surrounding component 22 to detect the input command by the user's finger. A detective surface (the foresaid partial structure) of the first detecting portion 181 faces outwardly to detect the input command. The second detecting portion 183 faces a lateral surface of the adjusting ring 30 to detect an orientation index tag disposed on the lateral surface. When the adjusting ring 30 is manually rotated, the second detecting portion 183 can read the orientation index tag moved with the rotation of the adjusting ring 30, so as to determine a rotary angle of the adjusting ring 30 relative to the surrounding component 22. The orientation index tag can be a notch texture or a reflective thin film.

Figure 5:
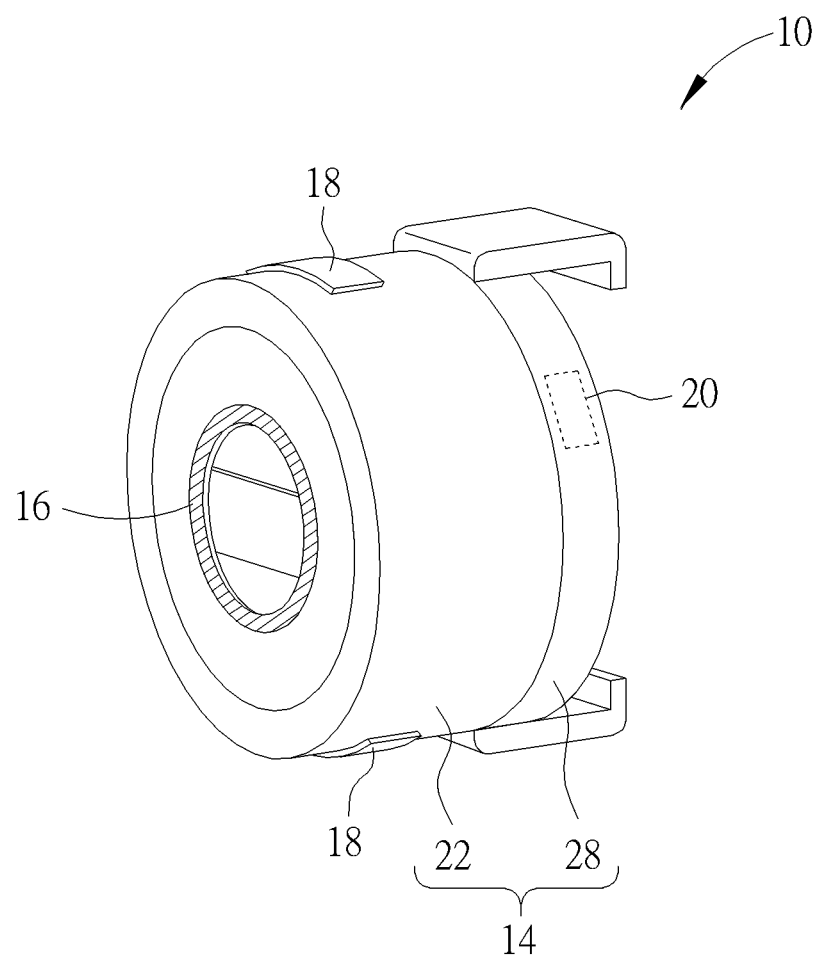
FIG. 5 is a diagram of the camera device according to a third embodiment of the present invention.

Please refer to FIG. 5. FIG. 5 is a diagram of the camera device 10 according to a third embodiment of the present invention. The camera device 10 can include two touch navigation modules 18 respectively disposed on opposite positions on the outer surface of the surrounding component 22. The touch navigation modules 18 are respectively adapted to detect a click command and a shift command, or each touch navigation module 18 can detect the click command and the shift command. For operating the camera device 10, two fingers are respectively put on the touch navigation modules 18 on the opposite positions of the surrounding component 22. One of the fingers (such as a thumb) can click the corresponding touch navigation module 18 to switch the adjustable mode of the lens assembly 24, and the other finger (such as a forefinger or a middle finger) can slide above the other corresponding touch navigation module 18 to vary the parameter of the adjustable mode after the intended adjustable mode is selected. Design of the camera device 10 conforms to the normal operation habit of the monocular camera.

The present invention replaces the conventional rotary ring by the touch navigation module. The touch navigation module is disposed outside the surrounding component of the camera device to control functions of the lens module. The touch navigation module can be an optical finger navigation module, a capacitance detecting navigation module, or a radio frequency (RF) detecting navigation module. A detective area of the touch navigation module is at least greater than 20 square millimeters (mm$^2$) to accurately detect a click and a shift of the user's finger. In addition, a resolution of the touch navigation module is at least greater than 200 dots per inch (DPI), so that the touch navigation module further detects a biometric characteristic of the user, such as a finger print. The user can store the habitual parameter into a memory card of the camera device according to an operational habit. When the biometric characteristic detected by the touch navigation module is forbidden by identity authentication, operation functions of the lens assembly is constrained by the digital processing unit, and the camera device is shut down. When the biometric characteristic detected by the touch navigation module is permitted by the identity authentication, the lens assembly is actuated by the digital processing unit, and the digital processing unit further automatically set the habitual parameter of the lens assembly according to the predetermined operational habit of the biometric characteristic, so as to increase operational convenience.

Comparing to the prior art, the touch navigation module of the present invention can replace the conventional mechanic button and the conventional rotary ring, so as to simplify structural configuration of the camera device for an appearance trend of modularity and thin design. The touch navigation module utilizes optical detection, capacitance detection or radio frequency detection to detect the click amount and the shift direction of the input command, to avoid a drawback that sensitivity and accuracy of the conventional mechanic button are decreased by long-term use. Besides, the touch navigation module of the present invention reads the input command and the adjusting ring by the optical detecting technique, which has advantages of low attrition rate and great reliability of the camera device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A camera device without an image displaying function, the camera device being adapted to assemble with a portable electronic device with a vision display, the camera device being electrically connected to the portable electronic device via wire connection or wireless connection, the vision display being adapted to display a parameter and an adjusted effect of the camera device when the camera device is electrically connected to the portable electronic device, the camera device comprising:
   a base, the base comprising a surrounding component;
   a lens disposed inside the surrounding component, the lens comprising a lens assembly and a digital processor; and
   at least one touch navigator disposed on an outer surface of the surrounding component and electrically connected to the lens, the touch navigator utilizing optical detection, capacitance detection or radio frequency detection to detect an input command to trigger the lens assembly to capture an image, or varying the parameter of an adjustable mode of the lens assembly via the digital processor;
   wherein the camera device comprises two touch navigators respectively disposed on opposite positions on the outer surface of the surrounding component, one of the two touch navigators detects a click command to switch the adjustable mode of the lens assembly, and the other touch navigator detects a shift command to vary the parameter of the adjustable mode.

2. The camera device of claim 1, wherein the base further comprises an engaging component disposed on the surrounding component, the surrounding component is detachably assembled with the portable electronic device by the engaging component.

3. The camera device of claim 1, wherein the lens assembly comprises a plurality of adjustable modes, the plurality of adjustable modes comprises a shutter speed adjusting mode, an aperture adjusting mode, a focal length adjusting mode, an exposure value adjusting mode, and a photosensitivity adjusting mode.

4. The camera device of claim 1, further comprising:
   a transmitter, the image captured by the lens being displayed on the vision display of the portable electronic device via the transmitter.

5. The camera device of claim 4, wherein the transmitter further receives a control command generated by the portable electronic device to switch the adjustable mode of the lens assembly.

6. The camera device of claim 1, wherein the touch navigator triggers the lens assembly or switches the adjustable mode of the lens assembly according to a click amount of the input command.

7. The camera device of claim 1, wherein the touch navigator varies the parameter of the lens assembly according to a shift direction of the input command.

8. The camera device of claim 1, wherein an adjusting ring of the camera device is rotatably disposed outside the surrounding component and connected to the lens, and the adjusting ring is rotated to vary the parameter of the lens assembly.

9. The camera device of claim 1, wherein the second detecting portion faces a lateral surface of the adjusting ring, so as to detect an orientation index tag disposed on the lateral surface.

10. The camera device of claim 1, wherein a detective area of the touch navigator is at least greater than 20 square millimeters, and a resolution of the touch navigator is at least greater than 200 dots per inch.

11. The camera device of claim 1, wherein the touch navigator further detects a biometric characteristic, the digital processor automatically sets the parameter of the lens assembly according to the biometric characteristic.

12. The camera device of claim 11, wherein the digital processor determines whether the lens assembly is actuated according to the biometric characteristic.

13. The camera device of claim 1, wherein the touch navigator comprises a first detecting portion and a second detecting portion, the first detecting portion detects the input command, and the second detecting portion detects a rotary angle of an adjusting ring relative to the surrounding component.

* * * * *